UNITED STATES PATENT OFFICE.

SHERWOOD S. KNIGHT, OF BERKELEY, CALIFORNIA.

PROCESS OF MAKING STEEL AND IRON.

1,213,806.  Specification of Letters Patent.  Patented Jan. 23, 1917.

No Drawing.  Application filed February 18, 1914. Serial No. 819,499.

*To all whom it may concern:*

Be it known that I, SHERWOOD S. KNIGHT, a citizen of the United States, residing at Berkeley, in the county of Alameda and State of California, have invented new and useful Improvements in Processes of Making Steel and Iron, of which the following is a specification.

My invention is a method of making iron and steel of very high grades wholly or largely from cheap, inferior, cold raw material.

While I ordinarily use a basic, open-hearth furnace in this process, under certain conditions any basic regenerative furnace or electrical furnace of either induction or resistance types, or combinations of these, may be used.

Inasmuch as the successive elimination of the impurities including carbon in steel tends to cause the product to approximate pure iron, the exact point where the material ceases to be steel and becomes iron is undefined and apparently undefinable.

My invention has to do with the production of both steel and iron;—the final product depending upon the point to which elimination of elements other than iron has been carried, or the amount of elements other than iron added to produce the desired grade of steel.

Various attempts have been made to make high grade iron and steel without the use of pig iron, cast iron or other iron products high in carbon, such as cementation steel and the like. In making this class of products at the present time out of cold stock by other methods, from 50% to 70% of pig iron or cast iron is usually required, while by my process under ideal conditions, no such material is required, whereas under average conditions but 10% or less would be required, and in no case would over 20% be required. It will be understood that light barometric pressure, increased percentages of aqueous vapor in the air, variation in the operation of the furnace, (due to defective draft, bad furnace lines and the like), all tend to require the use of pig iron or cast iron, and constitute variations from ideal operating conditions.

By my process, the highest grades of products are produced with raw material costing from 20% to 75% less than by former processes of manufacture. It will be understood that the wide range in saving depends upon the relative availability of the various grades of raw material I use in manufacturing under this process in the place where and at the time when the process is used.

There is another important advantage in the use of my process over all existing methods, namely: the time consumed in the manufacture is greatly reduced, running from 15% to 50%, according as conditions are more or less favorable. This is because the percentage of carbon in pig iron and cast iron is much greater than in the materials I use.

All grades of iron and steel are and have for many years been made by processes ordinarily known to the trade as the "puddling" process or the "ingot" process. Some of the iron heretofore manufactured by the puddling process is as pure as that manufactured by the ingot process and has the same general characteristics even in a more marked degree; but all puddled iron contains a small percentage of slag. All ingot iron and steel is slagless if properly made. The product of my improved process of manufacture is slagless although otherwise having the same crystalline mass as if made by the puddling process.

By my process, the cost of the high grade finished product will be greatly reduced for the reasons above stated; and will therefore go into more general use in the present lines and be put to many new uses.

Many attempts have been made to manufacture high grade steel in open hearth furnaces from cheap, raw material to the extent that I use it, but these attempts proved commercially unsuccessful principally for the two following reasons, viz: (1), the slag-forming material introduced to effect the elimination of phosphorus and sulfur built up on the bottom of the furnace, so reducing the holding capacity of the furnace as to render its operation unprofitable, and making it impracticable to get this mass out of the furnace; for when acid material was used for the purpose, the furnace bottom was badly damaged and expensive repairs were required; (2) the carbonizing material was charged in such a way that fuel, coming in contact with it at high velocity and heat, carried it out of contact with the metal of the bath before a sufficient carbonizing of the bath could take place. This carbonizing material was carried over into the slag-pockets and regenerating chambers of the furnace and in a short time would so accumulate as to seriously interfere with the draft of the furnace, making frequent expensive overhauling and repairs necessary. In my process the manner of charging obviates both these difficulties.

My process consists in charging in the manner now to be described a basic open-hearth furnace using oil, producer gas, tar or other fuel, after the furnace has been brought up to charging heat, the bottom having previously been put in good condition, all holes being patched and the filling set. (1) I first charge low carbon steel scrap of small section, or wrought iron-scrap such as mild steel-plate shearings, bundled sheet-scrap or material of a like kind, or borings and turnings of steel regardless of their carbon content, directly onto the bottom of the furnace so as to completely cover it. The object of this step is to place a layer of ferrous material between the basic material of the bottom of the furnace and the basic material used for reducing the sulfur and phosphorus content of the charge in the process as hereafter described. If this is not done, the basic material which is added for the reduction of the sulfur and phosphorus content will build onto the bottom of the furnace and very materially interfere with the economical operation of the furnace. This layer is then so heated as to reduce it to a pasty mass, which mass forms a shield and protection to the basic material of the bottom against the basic material subsequently charged. A relatively small quantity of oxid of iron in suitable form such as iron ore or rolling mill scale may be charged directly onto the first layer of ferrous material above described for the purpose of counteracting any excess carbon in the ferrous layer and thus facilitate the rapid operation of the process. If the material of the ferrous layer is low in carbon or is mild steel, the addition of iron oxid will be unnecessary. The first ferrous layer should constitute ordinarily about from 10% to 20% of the entire charge by weight. (2) When this first ferrous layer has begun to soften up or partially melt or become pasty, I charge burned lime or limestone, (the latter being preferred), on top of the ferrous layer. The amount of limestone used depends upon the amount of elements other than iron, such as phosphorus and sulfur in the ferrous material used and will usually run from 5% to 20% of the total charge according to the purity of the limestone and the impurity of the ferrous material in the bath. (3) Directly on top of this limestone layer, I charge steel-scrap and carbon-material such as retort-carbon, screened coke braize or anthracite coal screenings. If this second ferrous layer is charged in charging boxes, the boxes should be filled about four inches from the top with the steel-scrap and on top of this should be thrown the carbonaceous material so that when the charging boxes are inverted in dumping into the furnace, the steel-scrap will, as nearly as possible, cover up the carbonaceous material which will fall first upon the limestone and thus prevent it being forced into the slag pockets and regenerating chambers of the furnace by the draft. If the furnace is hand-charged, the fuel will have to be shut off and the draft discontinued while the carbonaceous material is being shoveled into the furnace onto the limestone and not turned on again with force until a sufficient quantity of steel scrap has been placed on top of it to protect it from the draft. Additional charges of steel scrap and carbonaceous material are added as needed until the entire charge is finished. (4) The furnace is then driven at as high a temperature as practicable, for the higher the temperature attained, the more rapidly the ferrous material will melt and consequently, the greater the saving in time in making the heat. The charge will normally melt down so that when the melting operation is finished, the carbon content of the bath will run from .50% to .90%. If it is found that the material does not melt high enough in carbon, a small amount of pig iron or cast iron scrap can be added to increase the carbon content to the degree preferred to make the operation of the furnace rapid and successful. It is preferable, of course, to charge such steel scrap as runs high in carbon. Heavy melting steel or scrap-steel rails usually carry from .20% to .45% carbon. After the ferrous material is melted, ore is then added sparingly, agitation of the bath is resorted to or the continued application of heat may be used until the material is brought down to such a carbon content as is required in the finished product. If a ferrous product almost free from elements other than iron is required, the material is left longer in the furnace, with or without additions to the slag of powdered burned lime or fluor-spar or both, until the bath shows such analysis and such freedom from elements other than iron as is necessary to produce a product of the prescribed grade. (5) When a bath of the required quality is obtained, the furnace is tapped in the usual way into a ladle. The cinder or slag is allowed to run off in the usual manner and in case any difficulty should be encountered by the phosphorus in the slag attempting to go back into the metal in the ladle, the addition of a small amount of powdered burned lime just before the ladle leaves the furnace and after the slag has run off as much as it will, effectually prevents this.

Material can be produced under the above described process of almost any desired degree of purity, sulfur being the only element which cannot be completely eliminated, it usually running .015% or over. Assuming that by this process a product has been produced having of silicon a trace, of manganese a trace, of sulfur .020%, of phosphorus a trace, and steel castings or steel ingots were required, it would be necessary to add in the bath or in the ladle such amounts of these elements other than iron as would insure a material of the desired composition. For making iron in ingot or other form, a small portion of aluminum, vanadium or titanium is added in the ladle, usually from 2 to 5 pounds per ton, all of which is consumed in de-oxidizing and de-gasifying the material in the bath as it runs into the ladle; but this has been the usual practice in steel manufacture for many years.

The steel or nearly pure iron base resulting from the manufacture under my above described process is especially suited to the manufacture of alloyed steels. The alloy may be made by uniting with this base the desired alloying materials, either molten or solid, just before tapping out, or afterward in the ladle. In this manner, very superior qualities of manganese steel, nickel-chrome, vanadium, titanium, etc. steel may be readily produced,—the extremely low phosphorus and sulfur content of the final product of my process enabling such alloys of better quality to be produced than by any other method at present in use, and at very considerable less cost.

I claim as my invention, and desire to secure by Letters Patent of the United States:—

1. The improvement in process of manufacturing iron or steel in a basic, open-hearth furnace, consisting, first, in charging directly onto the bottom a layer of ferrous material low in carbon to the extent of approximately 10% to 20% by weight of the entire charge, completely covering the bottom of the furnace; second, heating this ferrous material sufficiently to cause it to become a pasty mass; third, charging non-ferrous material containing free carbon, and subsequently charging a fluxing material and ferrous material; and fourth, finishing and drawing off the product.

2. The improved process for the manufacture of iron or steel consisting in— first: charging directly on the bottom of the furnace a complete layer, say 10% to 20% of the entire charge by weight,—of ferrous material comparatively low in carbon; second: charging directly upon said ferrous layer, when softened or pasty from heat, burned lime or limestone, about 5% to 20% of the entire charge; third: charging upon the limestone layer additional charges of ferrous material and carbonizing material of a non-ferrous nature composed largely of free carbon until the entire charge is completed; fourth, driving the furnace at a sufficiently high temperature to rapidly liquefy the ferrous material until the bath runs from .50% to .90% carbon (with or without addition of highly carbonized ferrous material as may be necessary to this end); fifth: after the ferrous material of the charge is liquefied, reducing the elements other than iron, and sixth, finishing and drawing off the product.

3. The improvement in the process of manufacturing refined iron or steel in a basic lined furnace, consisting first in charging directly onto the bottom of the furnace a layer of ferrous material such as steel or wrought iron scrap or material of a similar nature, in an amount sufficient to cover the bottom of the furnace, and heating said layer to reduce it to a pasty mass and thus forming a shield and protection to the basic material of the bottom against the basic material subsequently charged; then charging the furnace with basic material and ferrous material, and then rapidly reducing the comparative quantity of the materials other than iron and finishing and drawing off the product.

In testimony whereof I have hereunto set my hand in presence of two subscribing witnesses.

SHERWOOD S. KNIGHT.

Witnesses:
A. L. TILDESBY,
WALTER A. KNIGHT.